Dec. 23, 1941.    C. P. KOTTLOWSKI    2,267,304
CHAIN
Filed Oct. 14, 1939
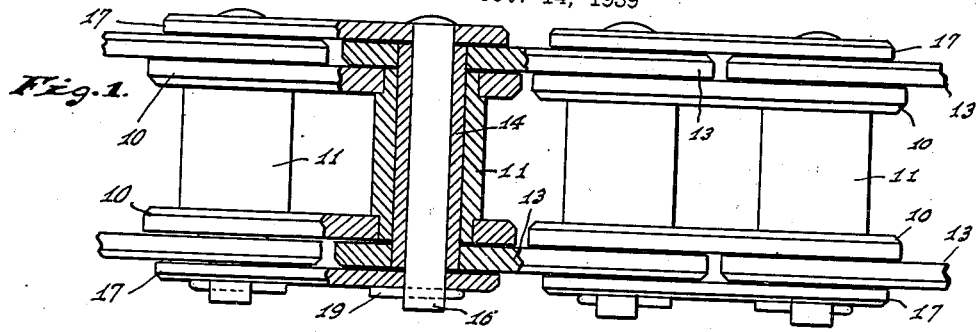
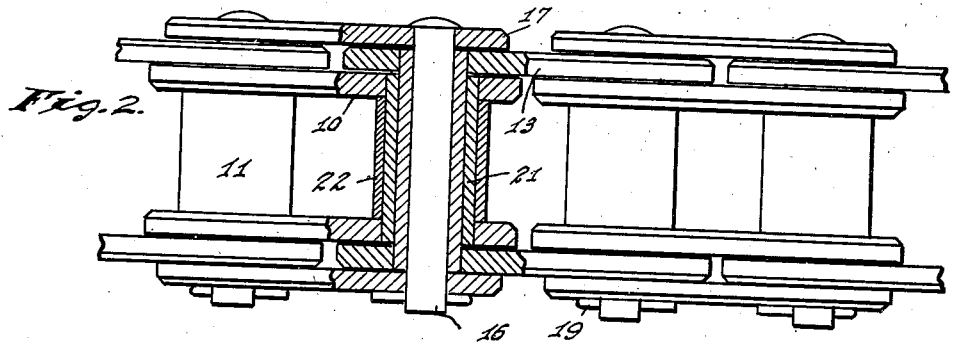
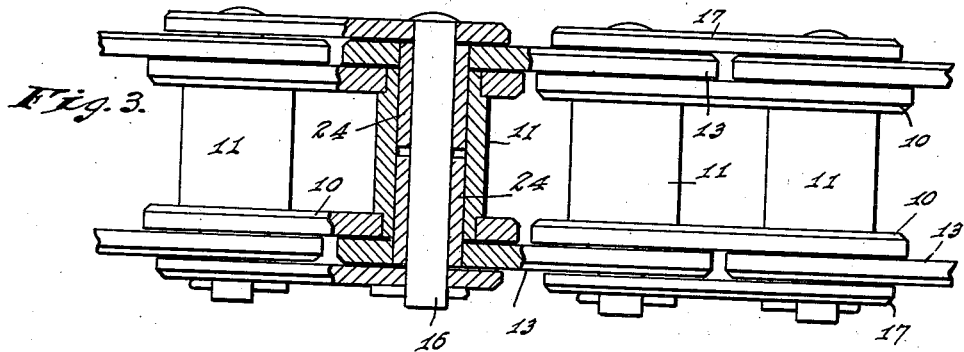
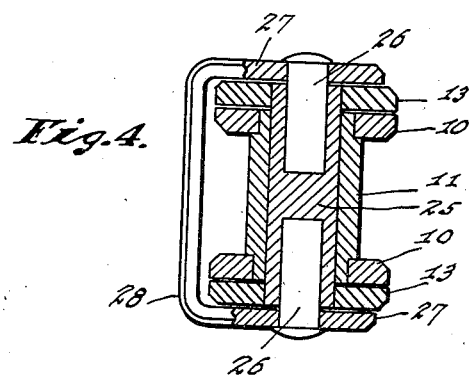
INVENTOR.
CLARENCE P. KOTTLOWSKI,
BY
ATTORNEYS.

Patented Dec. 23, 1941

2,267,304

UNITED STATES PATENT OFFICE 2,267,304

CHAIN

Clarence P. Kottlowski, Indianapolis, Ind., assignor to Diamond Chain and Manufacturing Company, Indianapolis, Ind., a corporation of Indiana Application October 14, 1939, Serial No. 299,477

3 Claims. (Cl. 74—255)

My invention relates to power-transmission chains of the type in which a series of sprocket-engaging links, called inner links, are interconnected by pin links embodying pins which pass through openings at the ends of the inner links. In such chains, it has been found that the pins of the pin links are subjected to beam loads sufficient to distort them and cause localization of wear, thus decreasing the effective life of the chain.

It is the object of my invention to decrease wear and increase the effective life of chains of the type above described. More specifically, it is my object to increase the rigidity of the pins of the chain, thus decreasing the extent of their distortion under load and correspondingly decreasing localization of wear. At the same time, I aim to increase the strength of the chain.

In carrying out my invention, I make the pins of the pin links hollow and I dispose within each a closely-fitting pin reinforcement which projects outwardly beyond the ends of the pin proper. These pin reinforcements are interconnected by side plates co-extensive with the inner links of the chain. Thus, as will be apparent hereinafter, the one-piece pin of the conventional chain, which in use is subjected to loading as a simple beam, is replaced by a unit which is, in effect, a continuous beam and which therefore possesses both greater strength and greater rigidity.

The accompanying drawing illustrates my invention: Fig. 1 is a plan view of a bushing-block chain with portions thereof broken away; Fig. 2 is a view similar to Fig. 1, but showing a roller-block chain; Fig. 3 is also a view similar to Fig. 1 showing a modification of my invention; and Fig. 4 is a cross-sectional view illustrating another modification.

In the bushing-block chain shown in Fig. 1, each inner link consists of a pair of inner side plates 10 supported upon the ends of shouldered bushings 11 which directly engage the teeth of sprockets with which the chain is used. The inner links, formed as described, are interconnected by pin links or connecting links, each of which comprises a pair of side plates 13, which overlap the ends of adjacent inner links, and hollow pins 14 which extend through the bushings of such adjacent inner links and the ends of which have a press fit in holes in the side plates 13 of the connecting links. This, except for the fact that the pins 14 are hollow, is a conventional form of chain construction.

In embodying my invention in a chain of the type described, I provide in each of the hollow pins 14 a pin-reinforcement 16, the ends of which extend outwardly beyond the ends of the associated hollow pin 14. The successive pin-reinforcements 16 are interconnected in pairs by auxiliary side plates 17 which are co-extensive with the inner side plates 10. Each pin reinforcement is held in place as by having one end headed over the associated auxiliary side plate 17 and the other end drilled transversely for the reception of a retaining pin 19.

When the chain illustrated in Fig. 1 is subjected to tension, the pin unit which is shown in section and which consists of the hollow pin 14 and the pin-reinforcement 16 will have leftwardly directed forces applied to it throughout the extent of the bushing 11 and in the planes of the respective auxiliary side plates 17, and will have rightwardly directed forces applied to it in the planes of the respective connecting-link plates 13. Since each of the side plates 13 is disposed between the bushing 11 and an auxiliary side plate 17, the pin-assembly is, in effect, a continuous beam and therefore both stronger and more rigid than it would be in the absence of the auxiliary side plates 17. Moreover, since the pin-reinforcement 16 is rigid with the associated bushing 11, the wear which follows relative movement of adjacent links about their axis of pivotal interconnection is distributed over the interengaging surfaces of the pin-reinforcement and pin as well as over the interengaging surfaces of the pin and bushing. Thus the effective wearing surface is much greater, and the rate of wear much less, than if solid pins were used.

The chain illustrated in Fig. 2 is identical with that illustrated in Fig. 1 except that the shouldered bushings 11 are replaced with straight bushings 21 and the latter are provided with sprocket-engaging rollers 22.

Because of inevitable inaccuracies in manufacture, it is a practical impossibility to obtain, in a new chain, the ideal condition in which the load on the chain will be distributed evenly between the inner and outer surfaces of the hollow pins 14. As a result, in the construction shown in Figs. 1 and 2, some localization of loading will inevitably result until sufficient wear has occurred to compensate for manufacturing inaccuracies. Such localization of wear in new chain can be at least in part eliminated by making either the pin or its reinforcement, or both, discontinuous transversely of the chain.

The chain illustrated in Fig. 3 is substantially the same as that shown in Fig. 1 except that I have substituted for the one-piece hollow pin 14 a two-piece pin made of two sections 24. Each of these sections has a press fit in its associated side plate 13, and the two sections extend from their respectively associated side plates into juxtaposition within the bushing 11.

In the arrangement illustrated in Fig. 4, the pin-reinforcement rather than the pin proper is made discontinuous. The pin 25, instead of having an axial bore extending completely through it, has deep axial recesses in its ends, such recesses receiving pin-reinforcements 26. These pin-reinforcements extend outwardly beyond the ends of the pin 25 and through auxiliary side plates 27 which are co-extensive with the inner links. When the pin reinforcements are made discontinuous, as illustrated in Fig. 4, they can of course no longer serve to hold the auxiliary side plates in place on the chain and it becomes necessary to employ an additional means for this purpose. One such means, which is suitable when only one face of the chain engages sprockets, is illustrated in Fig. 4, where the two auxiliary side plates of each pair are rigidly interconnected by a bridge or yoke 28. In this construction, the side plates 27 and bridge 28 are desirably integral with each other, being formed as a casting or forging; and the pin-reinforcements 26 have their outer ends headed or otherwise expanded so as to be rigidly connected with the side plates 27.

It will be clear from the above that in a chain embodying my invention the transversely extending members which provide for the pivotal interconnection of adjacent links are, in effect, continuous beams and, as such, are both stronger and more rigid than they would be in the absence of the auxiliary side plates. In the specific structures illustrated, which are preferred forms of the invention, the fact that each pivot means is composite and comprises two concentric, relatively rotatable members results in a marked increase in bearing area and a consequent decrease in the rate of wear.

I claim as my invention:

1. In a chain, a series of inner links each having at its ends openings extending through it, pins disposed in said openings, pin-reinforcing members disposed in said pins and projecting outwardly beyond the ends thereof, main side plates interconnecting the adjacent pins in adjacent inner links, and auxiliary side plates disposed outwardly of said main side plates and interconnecting pin-reinforcing members of each inner link, said pins being rigid with the associated main side plates and said pin-reinforcing members being rigid with associated auxiliary side plates each of said pins being formed of two parts which extend respectively inwardly from said opposite main side plates into juxtaposition near the medial plane of the associated inner link, each of said pin-reinforcing members extending continuously for the width of the chain and through said auxiliary side plates at opposite sides thereof.

2. In a chain, a row of longitudinally spaced inner links, main side plates arranged in pairs with the two members of each pair disposed in laterally alined positions on opposite sides of the row of inner links and overlapping the adjacent ends of adjacent links, a pair of auxiliary side plates longitudinally co-extensive with each of said inner links and disposed outwardly beyond and overlapping the ends of adjacent main side plates, the overlapping portions of said inner links and said main and auxiliary side plates being provided with co-axial openings, and means for pivotally connecting each end of each pair of main side plates with the adjacent inner link and its associated pair of auxiliary side plates, said means comprising three concentric pivot members, one of said pivot members extending transversely of the chain and having its ends non-rotatably received in the alined openings in a pair of corresponding side plates, and the other two of said pivot members being respectively and non-rotatably secured in the alined openings of the other pair of side plates and extending therefrom inwardly of the chain, the two last named pivot members having cylindrical bearing surfaces rotatably engaging a cylindrical bearing surface on the other pivot member.

3. In a chain, a series of inner links each having at its ends openings extending through it, pins disposed in said openings, pin-reinforcing members disposed in said pins and projecting outwardly beyond the ends thereof, main side plates interconnecting the adjacent pins in adjacent inner links, and auxiliary side plates disposed outwardly of said main side plates and interconnecting pin-reinforcing members of each inner link, said pins being rigid with the associated main side plates and said pin-reinforcing members being rigid with said auxiliary side plates, each of said pins extending continuously through its associated inner link and through said main side plates at opposite sides thereof, each of said pins having axial recesses in its ends, said pin-reinforcing members being disposed in said recesses, and each pair of said auxiliary side plates being provided with means interconnecting them.

CLARENCE P. KOTTLOWSKI.